（12） United States Patent
Gao et al.

(10) Patent No.: US 11,136,635 B2
(45) Date of Patent: Oct. 5, 2021

(54) ULTRASONIC ROLLER BURNISHING SYSTEM AND METHOD, AND METHOD FOR MACHINING COMPONENT

(71) Applicant: General Electric Company, Schenectady, NY (US)

(72) Inventors: Qing Gao, Shanghai (CN); Yingna Wu, Shanghai (CN); Thomas Edward Wickert, Greenville, SC (US); Yingbin Bao, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 16/606,854

(22) PCT Filed: Apr. 21, 2017

(86) PCT No.: PCT/CN2017/081353
§ 371 (c)(1),
(2) Date: Oct. 21, 2019

(87) PCT Pub. No.: WO2018/191931
PCT Pub. Date: Oct. 25, 2018

(65) Prior Publication Data
US 2020/0048725 A1 Feb. 13, 2020

(51) Int. Cl.
*C21D 7/08* (2006.01)
*B23P 9/02* (2006.01)

(52) U.S. Cl.
CPC . *C21D 7/08* (2013.01); *B23P 9/02* (2013.01)

(58) Field of Classification Search
CPC ..... C21D 7/08; B23P 9/02; B23P 9/04; B24B 39/026; B24B 1/04; B24B 39/006
See application file for complete search history.

(56) References Cited

U.S. PATENT DOCUMENTS 8,782,902 B2 * 7/2014 Pyun ..................... B24B 39/006
29/898.13
2002/0174528 A1 11/2002 Prevey, III
(Continued)

FOREIGN PATENT DOCUMENTS

| CN | 201020638 Y | 2/2008 |
| CN | 103052457 A | 4/2013 |

(Continued)

OTHER PUBLICATIONS

International Search Report of the International Searching Authority for PCT/CN2017/081353 dated Jan. 25, 2018.
(Continued)

*Primary Examiner* — Lee A Holly
(74) *Attorney, Agent, or Firm* — James Pemrick; Hoffman Warnick LLC (57) ABSTRACT

An ultrasonic roller burnishing system comprises a roller and a controller. The roller is configured to be pressed against a surface of a workpiece to a pressing depth, roll on the surface at a feed rate, and vibrate at an ultrasonic frequency under a back pressure. The roller is pressed and rolled by a motion unit which is driven by a drive motor. The vibrating of the roller is driven by an ultrasonic vibration unit with an input current inputted thereinto. The controller is configured to adjust at least one of the pressing depth, the back pressure, the input current and the feed rate based on an expected residual compressive stress and a real time output power of the drive motor, to generate a residual compressive stress in the workpiece which is in an expected range predetermined based on the expected residual compressive stress.

10 Claims, 6 Drawing Sheets

(56) References Cited

U.S. PATENT DOCUMENTS

| 2006/0237104 | A1* | 10/2006 | Statnikov | B23P 9/04 |
| | | | | 148/400 |
| 2011/0223443 | A1 | 9/2011 | Scheel et al. | |
| 2013/0026147 | A1 | 1/2013 | Care | |

FOREIGN PATENT DOCUMENTS

| CN | 103313821 A | 9/2013 |
| CN | 104249234 A | 12/2014 |
| CN | 206065803 U | 4/2017 |
| DE | 102008032919 A1 | 1/2010 |
| EP | 2519380 A1 | 11/2012 |
| EP | 2519380 B1 | 11/2012 |
| GN | 1373698 A | 10/2002 |
| GN | 101130828 A | 2/2008 |
| GN | 105689959 A | 6/2016 |
| GN | 105855792 A | 8/2016 |
| JP | S56171145 U | 12/1981 |
| JP | H01199758 A | 8/1989 |
| KR | 20150062814 A | 6/2015 |
| WO | 02/06007 A1 | 1/2002 |
| WO | WO2011115667 A1 | 9/2011 |
| WO | WO2014017460 A1 | 1/2014 |

OTHER PUBLICATIONS

Chinese Patent Application No. 201780089436.4, Office Action dated Jan. 25, 2021, 24 pages.
Gao, Qing, "Electromachining & Mould", Study of Ultrasonic Roller Burnishing Process, Apr. 20, 2017, pp. 66-69.
Extended European Search Report from European Patent Application No. 17906705.3 dated Oct. 27, 2020.
Database WPI, Week 200879, Thomson Scientific, London, GB; AN 2008-N53265 (refers to CN101130828 listed above).
Japanese Patent Application No. 2019-555210, Office Action dated Jun. 4, 2021, 3 pages.

* cited by examiner

ULTRASONIC ROLLER BURNISHING SYSTEM AND METHOD, AND METHOD FOR MACHINING COMPONENT

BACKGROUND

Embodiments of the present disclosure relate generally to ultrasonic roller burnishing systems and methods, and more particularly to methods for machining components.

The residual compressive stress refers to a compressive stress that remain in a solid material after an original cause of the stress is removed. The residual compressive stress can effectively extend a fatigue life of the component, relieve corrosion fatigue and reduce stress corrosion cracking.

In conventional methods, the residual compressive stress can be induced into the component by an ultrasonic roller burnishing method. In some cases, residual compressive stresses with different values are required for different areas of the component respectively. However, the conventional ultrasonic roller burnishing method cannot control the value of the induced residual compressive stress, and thus cannot meet performance requirements of the component well.

Therefore, it is desirable to provide new ultrasonic roller burnishing systems and methods and new methods for machining components to solve the above-mentioned problems.

BRIEF DESCRIPTION

In one aspect, an ultrasonic roller burnishing system comprises a roller and a controller. The roller is configured to be pressed against a surface of a workpiece to a pressing depth, roll on the surface at a feed rate, and vibrate at an ultrasonic frequency under a back pressure, wherein the roller is pressed and rolled by a motion unit which is driven by a drive motor, and the vibrating of the roller is driven by an ultrasonic vibration unit with an input current inputted thereinto. The controller is configured to adjust at least one of the pressing depth, the back pressure, the input current and the feed rate based on an expected residual compressive stress and a real time output power of the drive motor, to generate a residual compressive stress in the workpiece which is in an expected range predetermined based on the expected residual compressive stress.

In another aspect, an ultrasonic roller burnishing method comprises pressing a roller against a surface of a workpiece to a pressing depth and driving the roller to roll on the surface at a feed rate by a motion unit which is driven by a drive motor; vibrating the roller at an ultrasonic frequency under a back pressure, wherein the vibrating of the roller is driven by an ultrasonic vibration unit with an input current inputted thereinto; and adjusting at least one of the pressing depth, the back pressure, the input current and the feed rate based on an expected residual compressive stress and a real time output power of the drive motor, to generate a residual compressive stress in the workpiece which is in an expected range predetermined based on the expected residual compressive stress.

In another aspect, a method for machining a component comprises determining an expected distribution of residual compressive stress of the component, wherein the expected distribution comprises location information of at least one expected area on the component and an expected residual compressive stress corresponding to the expected area. The method further comprises machining the expected area with an ultrasonic roller burnishing device comprising a roller, to generate a residual compressive stress in the expected area is in an expected range predetermined based on the corresponding expected residual compressive stress. The step of machining comprises pressing the roller against a surface of the expected area to a pressing depth and driving the roller to roll on the surface at a feed rate by a motion unit which is driven by a drive motor; vibrating the roller at an ultrasonic frequency under a back pressure, wherein the vibrating of the roller is driven by an ultrasonic vibration unit with an input current inputted thereinto; and adjusting at least one of the pressing depth, the back pressure, the input current and the feed rate based on the expected residual compressive stress and a real time output power of the drive motor.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

Embodiments of the present disclosure refer to an ultrasonic roller burnishing system, which can be widely applied in part manufacturing and machining. The system can induce a residual compressive stress in a surface layer of a component and control a value or a vertical distribution of the residual compressive stress, in order to optimize a performance of the component.

Figure 1:
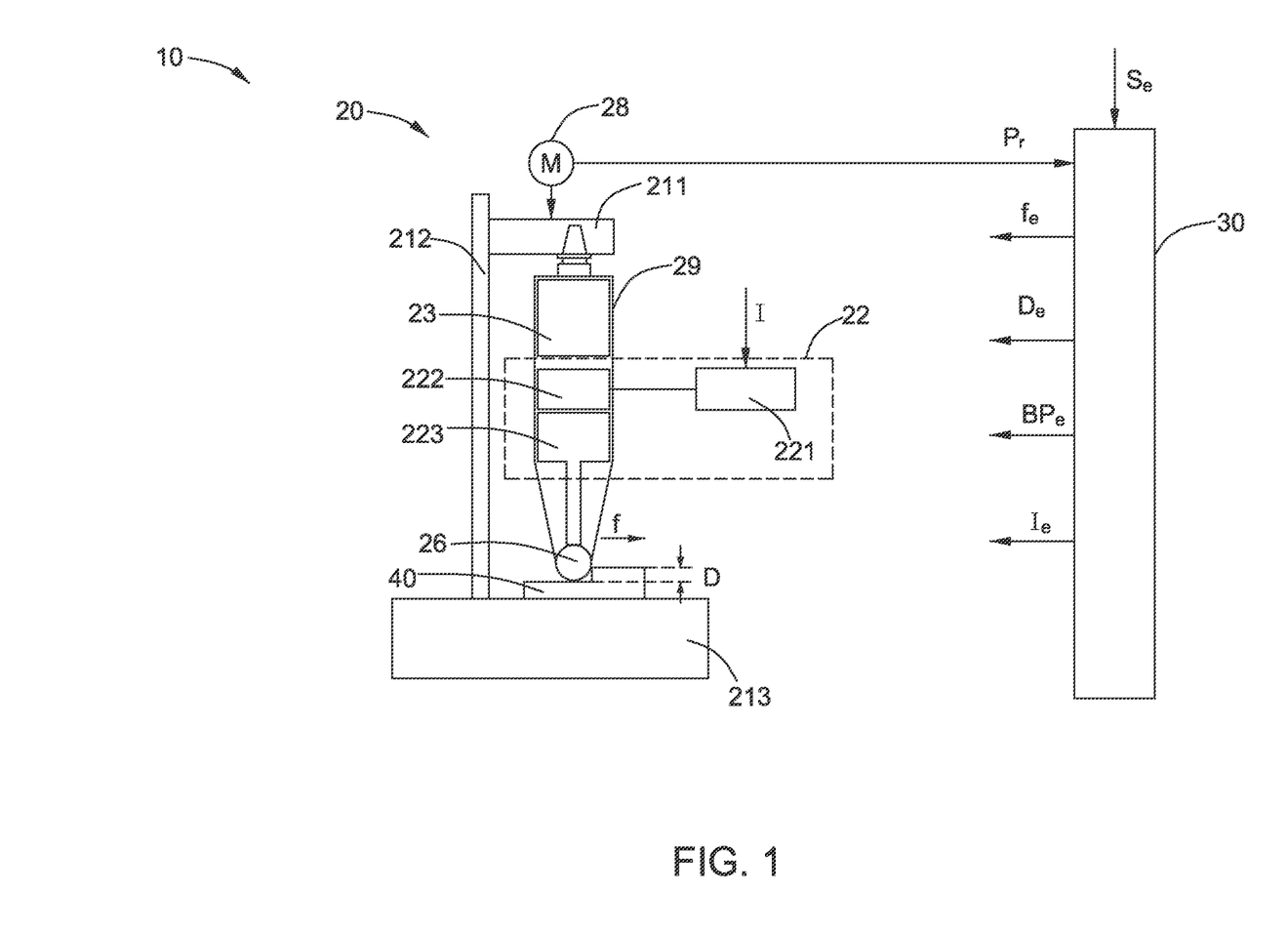
FIG. 1 is a sketch view of an ultrasonic roller burnishing system in accordance with an exemplary embodiment of the present disclosure, wherein the ultrasonic roller burnishing system comprises a controller.

FIG. 1 shows a sketch view of an ultrasonic roller burnishing system 10 in accordance with an exemplary embodiment of the present disclosure. Referring to FIG. 1, the ultrasonic roller burnishing system 10 comprises an ultrasonic roller burnishing device 20 configured to machine a workpiece 40, and a controller 30 configured to control the ultrasonic roller burnishing device 20 to machine the workpiece 40.

The ultrasonic roller burnishing device 20 comprises a motion unit, a shell 29, a back pressure device 23, an ultrasonic vibration unit 22 and a roller 26. The motion unit comprises a drive motor 28 and a plurality of motion components 211, 212, 213, which are configured to drive the shell 29 to move relative to the workpiece 40. The ultrasonic vibration unit 22 comprises an ultrasonic generator 221, an ultrasonic transducer 222 and an ultrasonic horn 223. The back pressure device 23, the ultrasonic transducer 222, the ultrasonic horn 223 are received in the shell 29. The roller 26 is rotatably coupled to the ultrasonic horn 223 and partly received in the shell 29. The roller 26 can rotate around its own axis or center, and may be in a shape of sphere or cylinder, but is not limited to these shapes.

The ultrasonic vibration unit 22 is configured to receive an input current I and drive the roller 26 to vibrate at an ultrasonic frequency. The ultrasonic generator 221 is configured to receive the input current I and output an oscillating current at an ultrasonic frequency. The ultrasonic frequency mentioned hereinafter refers to a frequency higher than 20 kilohertz, for example, in a range from about 20 to about 30 kilohertz. The ultrasonic transducer 222 is coupled with the ultrasonic generator 221 and configured to transduce the oscillating current into a mechanical vibration at the ultrasonic frequency. The ultrasonic transducer 222 may comprise a magnetostrictive transducer, a piezoelectric ceramic transducer or a combination thereof. The ultrasonic horn 223 is coupled with the ultrasonic transducer 222 and configured to amplify an amplitude of the mechanical vibration. The roller 26 is coupled with the ultrasonic horn 223, in such a manner that the ultrasonic horn 223 is configured to directly drive the roller 26 to vibrate at the ultrasonic frequency. The roller has a vibration intensity which corresponds to a value of the input current I. In some embodiments, the roller has a vibration amplitude less than 100 microns, for example, in a range from about 10 microns to about 50 microns, or from about 10 microns to about 12 microns. In some embodiments, the roller vibrates in a direction perpendicular to a surface of the workpiece 40.

The back pressure device 23 is configured to exert a back pressure BP on the roller 26, and thus the roller transmit this pressure to the workpiece 40. The back pressure BP is also configured to increase a resistance to the vibrating of the roller 26 and thus increase stability of the vibrating. The back pressure device 23 may comprise a pneumatic device, a hydraulic device, a spring or a combination thereof. In some embodiments, the back pressure device 23 comprises a pneumatic device, which generates the back pressure by compressing gas therein. The back pressure device 23 may further comprise a proportional valve for adjust a pressure of the gas and thus adjust a value of the back pressure exerted on the roller 26.

The motion unit driven by the drive motor is configured to move the shell 29, as well as the roller 26, relative to the workpiece 40. For example, the motion unit is configured to move the roller 26 in a direction perpendicular to the surface of the workpiece. Therefore, the motion unit is configured to press the roller 26 onto the surface of the workpiece to a pressing depth D, wherein the pressing depth D can be adjusted according to commands or instructions from the controller 30. The motion unit is also configured to drive the roller 26 to roll on the surface of the workpiece 40 at a feed rate. Therefore, the roller 26 can be pressed against the surface of the workpiece while it rolls on the surface at the feed rate.

When the ultrasonic roller burnishing device works, the roller is pressed against on the surface, rolls on the surface and vibrates simultaneously, in order to polish the surface of the workpiece and induce a residual compressive stress in the workpiece. An output power of the drive motor can indicate the residual compressive stress induced, and the output power of the drive motor depends on the pressing depth D, the back pressure BP, the input current I and the feed rate f. Therefore, the output power of the drive motor, as well as the residual compressive stress, can be controlled by adjusting at least one of the pressing depth D, the back pressure BP, the input current I and the feed rate f.

The controller 30 is configured to adjust at least one of the pressing depth D, the back pressure, the input current I and the feed rate f based on an expected residual compressive stress $S_e$ and a real time output power $P_r$ of the drive motor 28, to generate a residual compressive stress in the workpiece. The generated residual compressive stress is in an expected range predetermined based on the expected residual compressive stress $S_e$. In some embodiments, the expected residual compressive stress refers to a value of the residual compressive stress at a certain depth, or an average value of the residual compressive stresses in a certain depth range. The expected range refers to a value range around the value or the average value of the residual compressive stress. Specifically, the controller 30 is configured to calculate at least one of an expected pressing depth $D_e$, an expected back pressure $BP_e$, an expected input current $I_e$, and an expected feed rate $f_e$, based on the expected residual compressive stress $S_e$ and the real time output power $P_r$. Then, the at least one of the pressing depth D, the back pressure, the input current I and the feed rate f is adjusted according to the at least one of the expected pressing depth $D_e$, the expected back pressure $BP_e$, the expected input current $I_e$, and the expected feed rate $f_e$.

In some embodiments, the controller 30 is configured to calculate the expected pressing depth $D_e$, the expected back pressure $BP_e$, the expected input current $I_e$, and the expected feed rate $f_e$, based on the expected residual compressive stress $S_e$ and the real time output power $P_r$. Then, the pressing depth D, the back pressure, the input current I and the feed rate f are adjusted according to the expected pressing depth $D_e$, the expected back pressure $BP_e$, the expected input current $I_e$, and the expected feed rate $f_e$.

Figure 2:
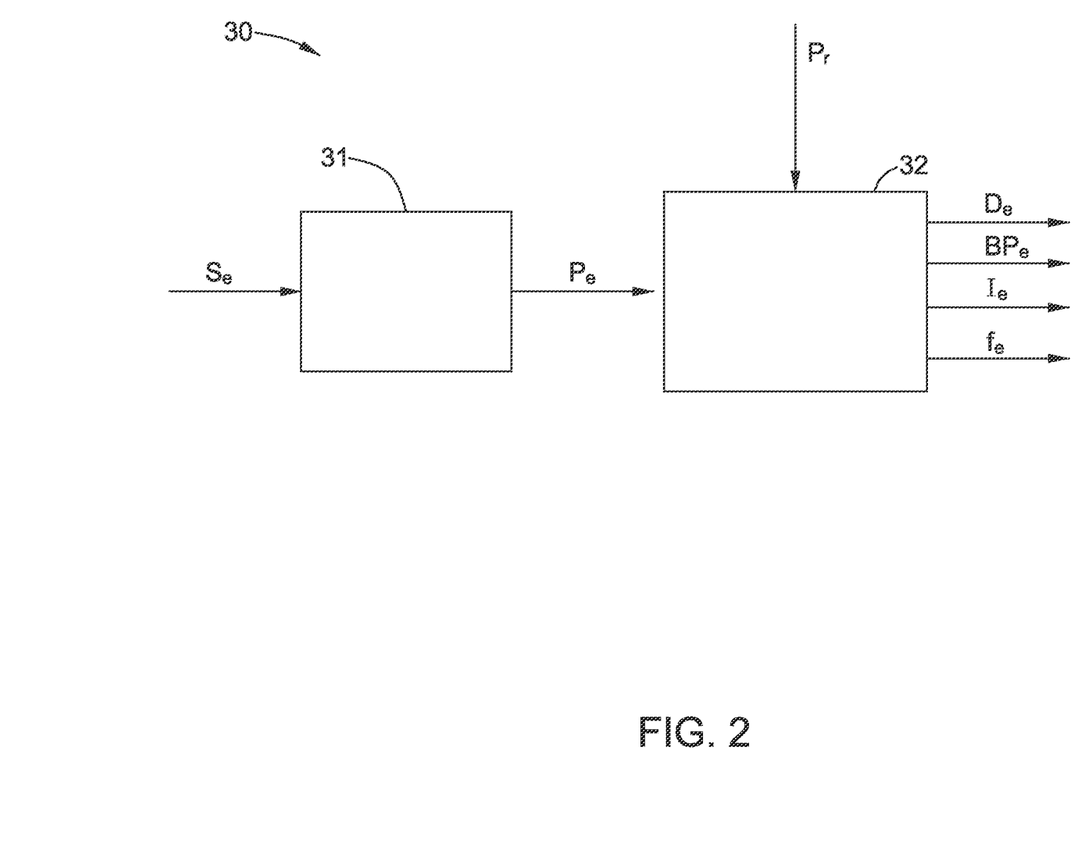
FIG. 2 is a sketch view of the controller in FIG. 1 in accordance with an exemplary embodiment of the present disclosure.

Referring to FIG. 2, the controller 30 comprises a first controller 31 and a second controller 32. The first calculator 31 is configured to calculate an expected output power $P_e$ based on the expected residual compressive stress $S_e$. The second calculator 32 is configured to calculate the at least one of the expected pressing depth $D_e$, the expected back pressure $BP_e$, the expected input current $I_e$, and the expected feed rate $f_e$ based on the expected output power $P_e$ and the real time output power $P_r$.

Embodiments of the present disclosure also refer to an ultrasonic roller burnishing method for machining a workpiece. The method can effectively control a value or a status of the residual compressive stress induced in the workpiece by monitoring an output power of the drive motor in real time.

Figure 3:
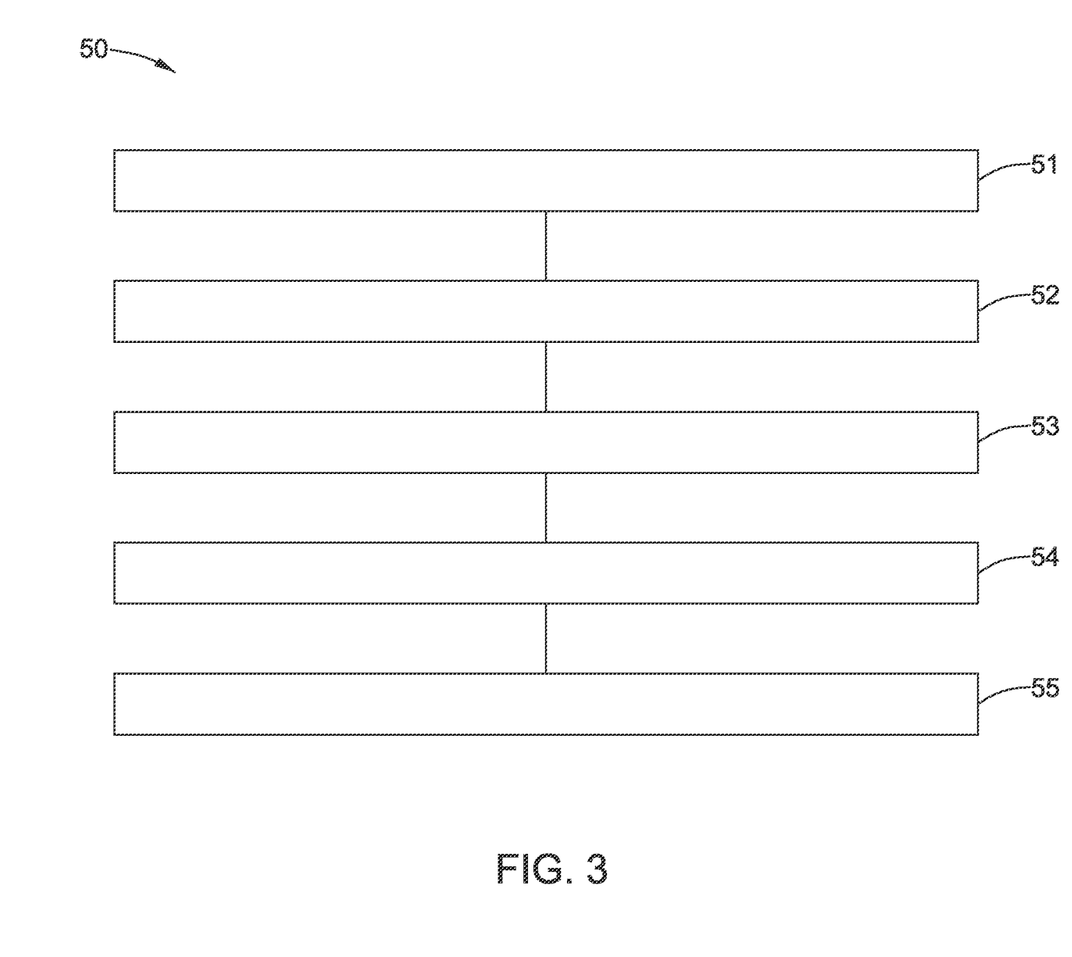
FIG. 3 is a flowchart illustrating an ultrasonic roller burnishing method in accordance with an exemplary embodiment of the present disclosure.

FIG. 3 is a flowchart illustrating an ultrasonic roller burnishing method 50 for machining a workpiece with an ultrasonic roller burnishing device, in accordance with an exemplary embodiment of the present disclosure, wherein the ultrasonic roller burnishing device comprises a roller and a motion unit. Referring to FIG. 3, the method 50 comprising steps 51-55. While the actions of the method 50 are illustrated as functional blocks, the order of the blocks and the separation of the actions among the various blocks shown in FIG. 3 are not intended to be limiting. For example, the blocks may be performed in a different order and an action associated with one block may be combined with one or more other blocks or may be sub-divided into a number of blocks.

In step 51, an expected residual compressive stress of the workpiece is determined according to practical needs. The expected residual compressive stress refers to an expected status of the residual compressive stress desired to be induced, which may comprise a value of the residual compressive stress at a certain depth, a distribution of the residual compressive stress in a certain depth range, an average value of the residual compressive stresses in a certain depth range, or a combination thereof.

In step 52, the motion unit presses the roller of the ultrasonic roller burnishing device against a surface of the workpiece to a pressing depth and drives the roller to roll on the surface at a feed rate. The motion unit is driven by a drive motor. In some embodiments, the motion unit drives the roller to roll on the surface along a preset path.

In step 53, the roller vibrates at an ultrasonic frequency under a back pressure, wherein the vibrating of the roller is driven by an ultrasonic vibration unit with an input current inputted thereinto. An amplitude or intensity of the vibrating may be adjusted by changing a frequency or an amplitude of the input current. In some embodiments, the vibrating of the roller is in a direction perpendicular to the surface. The back pressure exerted on the roller is generated by a back pressure device.

In step 54, a real time output power of the drive motor is detected. The output power of the drive motor can indicate the induced residual compressive stress, so the residual compressive stress can be controlled by controlling the output power of the drive motor. There is a relation between the output power of the drive and the generated residual compressive stress, wherein the relation can be represented by one or more mathematical models.

In step 55, at least one of the pressing depth, the back pressure, the input current and the feed rate is adjusted based on the expected residual compressive stress determined in step 51 and the real time output power of the drive motor detected in step 54, in order to generate a residual compressive stress in the workpiece which is in an expected range predetermined based on the expected residual compressive stress.

In some embodiments, the method further comprises calculating an expected output power based on the expected residual compressive stress. The adjusting comprises adjusting the at least one of the pressing depth, the back pressure, the input current and the feed rate based on the expected output power and the real time output power. Specifically, when the expected output power is higher than the real time output power, the adjusting comprises increasing at least one of the pressing depth, the back pressure and the input current, and/or decreasing the feed rate. When the expected output power is lower than the real time output power, the adjusting comprises decreasing at least one of the pressing depth, the back pressure and the input current, and/or increasing the feed rate.

In some embodiments, step 55 further comprises calculating at least one of an expected pressing depth, an expected back pressure, an expected input current and an expected feed rate based on the expected residual compressive stress and the real time output power, and then adjusting the at least one of the pressing depth, the back pressure, the input current and the feed rate according to the at least one of the expected pressing depth, the expected back pressure, the expected input current and the expected feed rate.

In some embodiments, the calculating of the at least one of the expected pressing depth, the expected back pressure, the expected input current and the expected feed rate comprises calculating an expected output power based on the expected residual compressive stress; and calculating the at least one of the expected pressing depth, the expected back pressure, the expected input current and the expected feed rate based on the expected output power and the real time output power.

In some embodiments, all of the pressing depth, the back pressure, the input current and the feed rate are adjusted based on the expected residual compressive stress and the real time output power of the drive motor. Therefore, step 55 comprises calculating the expected pressing depth, the expected back pressure, the expected input current and the expected feed rate, and then adjusting the pressing depth, the back pressure, the input current and the feed rate according to the expected pressing depth, the expected back pressure, the expected input current and the expected feed rate. It's worth mentioning that a plurality of sets of the expected pressing depth, the expected back pressure, the expected input current and the expected feed rate may be obtained based on the expected residual compressive stress and the real time output power. The optimal set of them can be selected as the adjusting basis, according to the practical needs.

In some embodiments, in order to improve response speed, only a part of the four parameters, i.e., the pressing depth, the back pressure, the input current and the feed rate, are selected to be adjusted.

Figure 4:
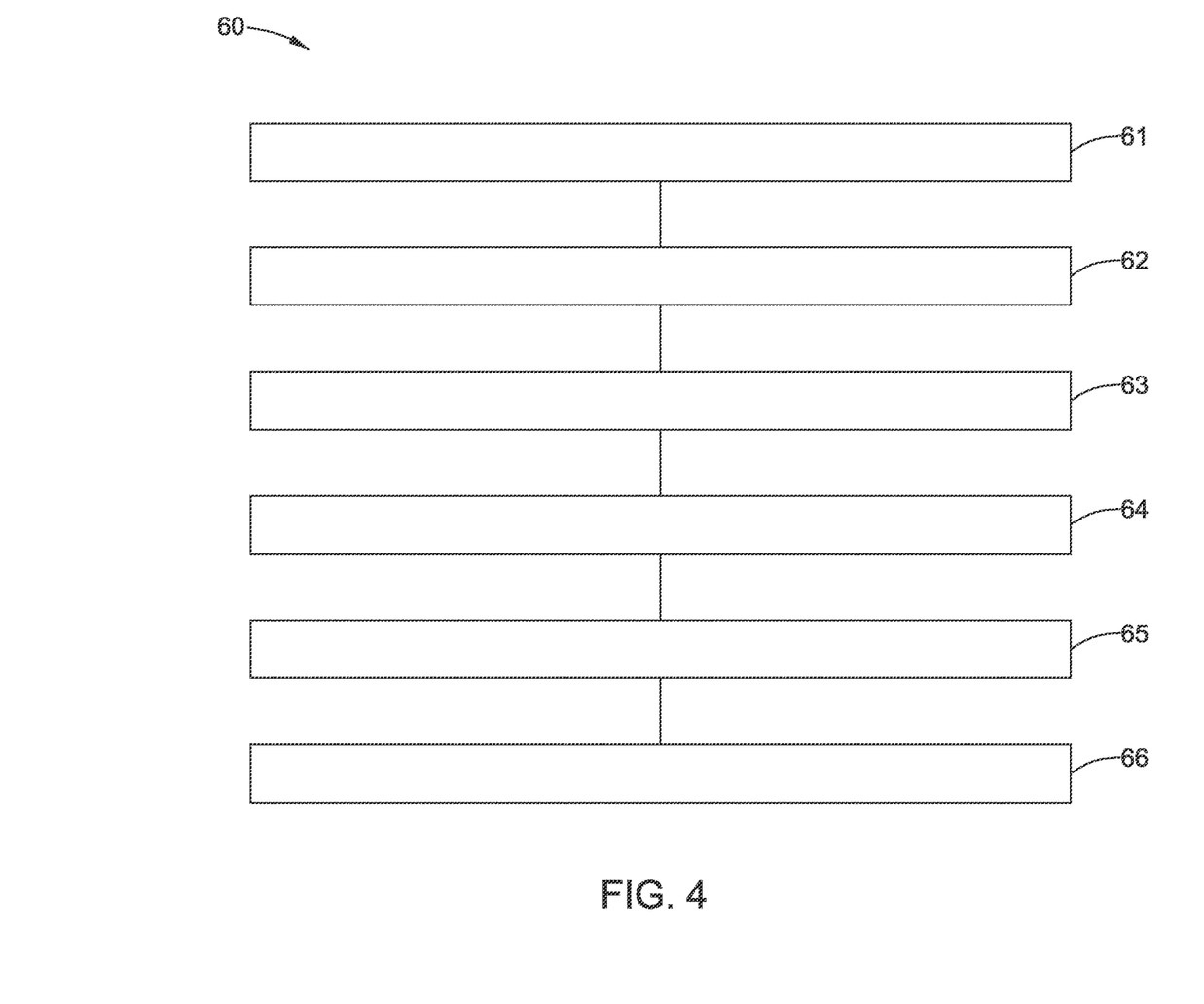
FIG. 4 is a flowchart illustrating an ultrasonic roller burnishing method in accordance with another exemplary embodiment of the present disclosure.

FIG. 4 is a flowchart illustrating an ultrasonic roller burnishing method 60 in accordance with another exemplary embodiment of the present disclosure.

Steps 61-64 are respectively similar with steps 51-54 of the method 50 illustrated in FIG. 3, which will not be repeated here.

In step 65, at least one of the real time pressing depth, the real time back pressure, the real time input current and the real time feed rate is detected. The detected real time parameter(s) will be used as the adjusting basis for other parameters, as well as the expected residual compressive stress and the real time output power.

In step 66, at least one of the pressing depth, the back pressure, the input current and the feed rate is adjusted based on the expected residual compressive stress, the real time output power, and the real time parameter(s) obtained in step 65.

For example, the real time input current is detected in step 65. Then, in step 66, the pressing depth, the back pressure, and the feed rate are adjusted based on the expected residual compressive stress, the real time output power and the real time input current. Specifically, an expected pressing depth, an expected back pressure and an expected feed rate are calculated based on the expected residual compressive stress, the real time output power and the real time input current, and then the pressing depth, the back pressure and the feed rate are adjusted according to the expected pressing depth, the expected back pressure and the expected feed rate.

Embodiments of the present disclosure also refer to a method for machining a component, which can be widely applied in manufacture of turbine blade or aircraft blade. The method comprises determining an expected distribution of residual compressive stress of the component, wherein the expected distribution comprising location information of at least one expected area on the component and an expected residual compressive stress corresponding to the expected area. The method further comprises processing the expected area with an ultrasonic roller burnishing device comprising a roller, to generate a residual compressive stress in the expected area which is in an expected range predetermined based on the corresponding expected residual compressive stress, in such a manner that a desired distribution of residual compressive stress can be induced in the component.

Figure 5:
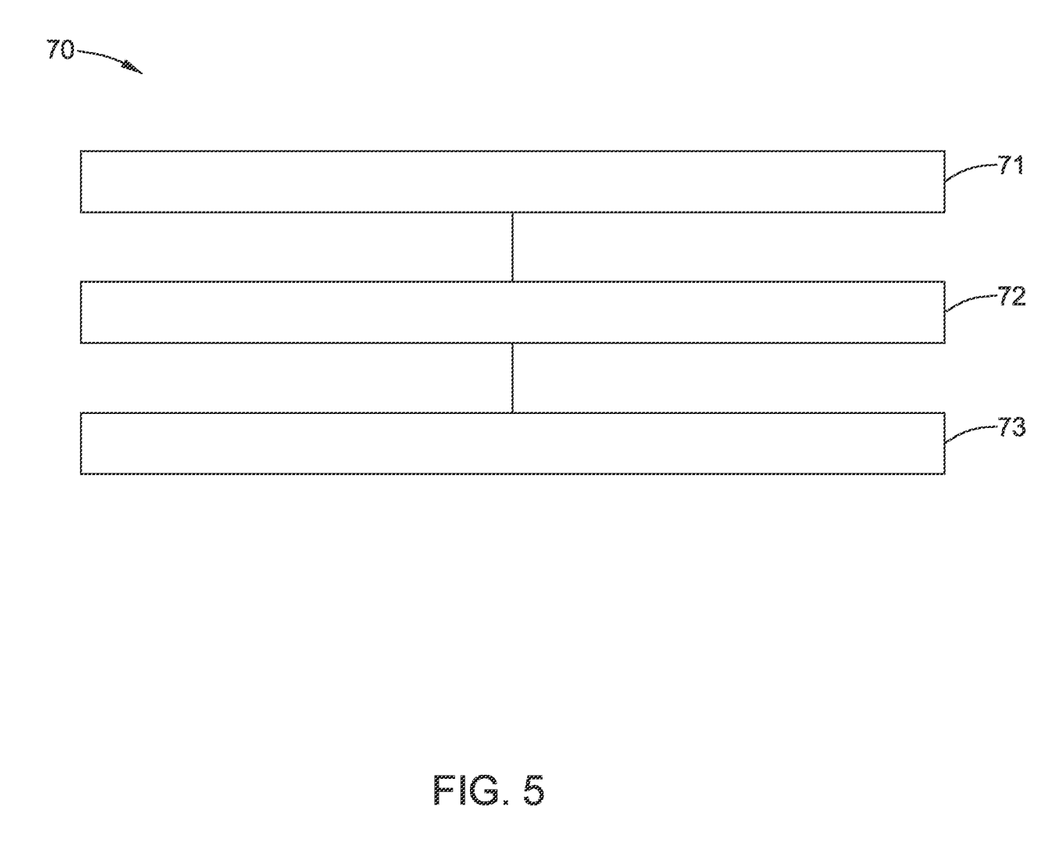
FIG. 5 is a flowchart illustrating a method for machining a component in accordance with an exemplary embodiment of the present disclosure.

FIG. 5 is a flowchart illustrating a method 70 for machining a component in accordance with an exemplary embodiment of the present disclosure. Referring to FIG. 5, the method 70 comprises steps 71-73.

Figure 6:
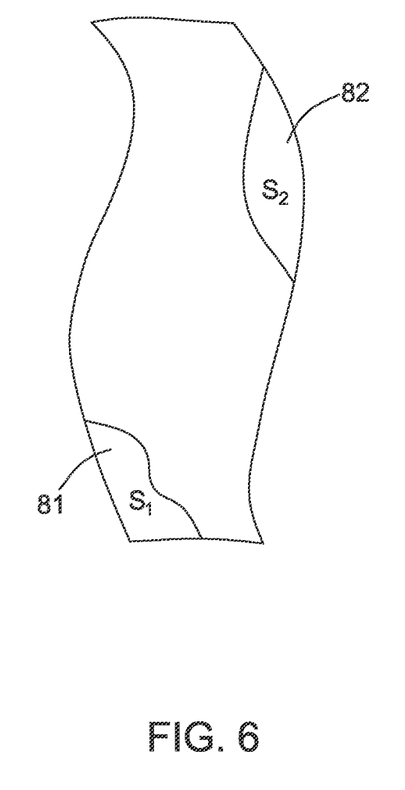
FIG. 6 is a sketch view illustrating a residual compressive stress distribution of a component in accordance with an exemplary embodiment of the present disclosure.

In step 71, an expected distribution of residual compressive stress of the component is determined. As shown in FIG. 6, the expected distribution comprises location information of a first expected area 81 on the component, a first expected residual compressive stress $S_1$ corresponding to the first expected area 81, location information of a second expected area 82 on the component, and a second expected residual compressive stress $S_2$ corresponding to the second expected area 82.

In step 72, the first expected area 81 is machined to generate a first residual compressive stress in the first expected area which is in a first expected range predetermined based on the first expected residual compressive stress $S_1$.

In step 73, the second expected area 82 is machined to generate a second residual compressive stress in the second expected area which is in a second expected range predetermined based on the second expected residual compressive stress $S_2$.

Step 72 or 73 comprises pressing the roller against a surface of the expected area to a pressing depth; driving the roller to roll on the surface at a feed rate by a motion unit which is driven by a drive motor; vibrating the roller at an ultrasonic frequency under a back pressure, wherein the vibrating of the roller is driven by an input current; and adjusting at least one of the pressing depth, the back pressure, the input current and the feed rate based on the expected residual compressive stress and a real time output power of the drive motor.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

The invention claimed is:

1. An ultrasonic roller burnishing system, comprising:
   a roller, configured to be pressed against a surface of a workpiece to a pressing depth, roll on the surface at a feed rate, and vibrate at an ultrasonic frequency under a back pressure, wherein the roller is pressed and rolled by a motion unit which is driven by a drive motor, and the vibrating of the roller is driven by an ultrasonic vibration unit with an input current inputted thereinto;
   a controller, configured to adjust at least one of the pressing depth, the back pressure, the input current and the feed rate based on an expected residual compressive stress and a real time output power of the drive motor, to generate a residual compressive stress in the workpiece which is in an expected range predetermined based on the expected residual compressive stress.

2. The system according to claim 1, wherein the controller is configured to calculate at least one of an expected pressing depth, an expected back pressure, an expected input current and an expected feed rate, based on the expected residual compressive stress and the real time output power, and adjust the at least one of the pressing depth, the back pressure, the input current and the feed rate, according to the at least one of the expected pressing depth, the expected back pressure, the expected input current and the expected feed rate.

3. The system according to claim 2, wherein the controller comprises:
   a first calculator, configured to calculate an expected output power based on the expected residual compressive stress; and
   a second calculator, configured to calculate the at least one of the expected pressing depth, the expected back pressure, the expected input current and the expected feed rate based on the expected output power and the real time output power.

4. An ultrasonic roller burnishing method, comprising:
   pressing a roller against a surface of a workpiece to a pressing depth and driving the roller to roll on the surface at a feed rate by a motion unit which is driven by a drive motor;
   vibrating the roller at an ultrasonic frequency under a back pressure, wherein the vibrating of the roller is driven by an ultrasonic vibration unit with an input current inputted thereinto; and
   adjusting at least one of the pressing depth, the back pressure, the input current and the feed rate based on an expected residual compressive stress and a real time output power of the drive motor, to generate a residual compressive stress in the workpiece which is in an expected range predetermined based on the expected residual compressive stress.

5. The method according to claim 4, wherein the adjusting comprises:
   calculating at least one of an expected pressing depth, an expected back pressure, an expected input current and an expected feed rate based on the expected residual compressive stress and the real time output power; and
   adjusting the at least one of the pressing depth, the back pressure, the input current and the feed rate according to the at least one of the expected pressing depth, the expected back pressure, the expected input current and the expected feed rate.

6. The method according to claim 5, wherein the calculating comprises:
   calculating an expected output power based on the expected residual compressive stress; and
   calculating the at least one of the expected pressing depth, the expected back pressure, the expected input current and the expected feed rate based on the expected output power and the real time output power.

7. The method according to claim 4, wherein the adjusting comprises: adjusting at least one of the pressing depth, the back pressure, the input current and the feed rate, based on the expected residual compressive stress, the real time output power, and at least one of a real time pressing depth, a real time back pressure, a real time input current and a real time feed rate.

8. The method according to claim 7, wherein the adjusting comprises:
calculating an expected pressing depth, an expected back pressure and an expected feed rate based on the expected residual compressive stress, the real time output power and the real time input current; and
adjusting the pressing depth, the back pressure and the feed rate according to the expected pressing depth, the expected back pressure and the expected feed rate.

9. A method for machining a component, comprising:
determining an expected distribution of residual compressive stress of the component, the expected distribution comprising location information of at least one expected area on the component and an expected residual compressive stress corresponding to the expected area; and
machining the expected area with an ultrasonic roller burnishing device comprising a roller, to generate a residual compressive stress in the expected area which is in an expected range predetermined based on the corresponding expected residual compressive stress, comprising:
pressing the roller against a surface of the expected area to a pressing depth and driving the roller to roll on the surface at a feed rate by a motion unit which is driven by a drive motor,
vibrating the roller at an ultrasonic frequency under a back pressure, wherein the vibrating of the roller is driven by an ultrasonic vibration unit with an input current inputted thereinto, and
adjusting at least one of the pressing depth, the back pressure, the input current and the feed rate based on the expected residual compressive stress and a real time output power of the drive motor.

10. The method according to claim 9, wherein the expected distribution comprises location information of a first expected area and a first expected residual compressive stress corresponding to the first expected area, and location information of a second expected area and a second expected residual compressive stress corresponding to the second expected area; and the generating of the residual compressive stress comprises:
machining the first expected area of the component to generate a first residual compressive stress in the first expected area which is in a first expected range predetermined based on the first expected residual compressive stress; and
machining the second expected area of the component to generate a second residual compressive stress in the second expected area which is in a second expected range predetermined based on the second expected residual compressive stress.

* * * * *